United States Patent [19]

Coons

[11] Patent Number: 4,758,932
[45] Date of Patent: Jul. 19, 1988

[54] DUAL FRONT HEADLIGHT ASSEMBLY

[75] Inventor: Robert R. Coons, Hinsdale, Ill.

[73] Assignee: J. I. Case Company, Racine, Wis.

[21] Appl. No.: 72,563

[22] Filed: Jul. 13, 1987

[51] Int. Cl.⁴ .............................................. B60Q 1/00
[52] U.S. Cl. ..................................... 362/80; 362/297; 362/346
[58] Field of Search ............... 362/297, 225, 346, 329, 362/80; 340/67, 94, 87

[56] References Cited

U.S. PATENT DOCUMENTS 4,532,578  7/1985  Gaden et al. ........................ 362/80
4,680,680  7/1987  Iwaki et al. ......................... 362/80

FOREIGN PATENT DOCUMENTS 1958761  5/1971  Fed. Rep. of Germany ........ 362/80

Primary Examiner—Carroll B. Dority, Jr.
Attorney, Agent, or Firm—Dressler, Goldsmith, Shore, Sutker & Milnamow, Ltd.

[57] ABSTRACT

A dual headlight assembly for use on agricultural and industrial equipment, such as tractors. Invention includes a sealed assembly of a transparent lens element, an intermediate lamp reflector member with reflective cavities, a removable lamp assembly and a rear enclosure member. The transparent lens and the rear enclosure create a housing for the other elements of the assembly. Access to the internal parts is provided through a removable access cover in the rear enclosure member.

4 Claims, 2 Drawing Sheets

DUAL FRONT HEADLIGHT ASSEMBLY

TECHNICAL FIELD OF THE INVENTION

The present invention relates generally to headlights for use in tractors and like agricultural and industrial equipment, and more particularly to dual or twin headlights attached to such equipment.

BACKGROUND OF THE INVENTION

Tractors and other like equipment are essential to industry. Traditionally, tractors and other mobile equipment have had headlights installed for a variety of reasons including movement in the dark on public roads and for operating the equipment without adequate natural light. In fact, in peak farming seasons equipment is often operated around the clock, thus creating the need for illumination in the work area.

The illumination must provide quality lighting to all 360° surrounding the equipment. The light provided must be well distributed in order to avoid blindspots. Blindspots occur when an area registering a high number of lumens is situated next to an area of a low number of lumens. If the number and size of these blindspots are too great the operator is unable to monitor implement performance.

In addition to providing good quality lighting, headlamps on farm equipment must be durable and reliable but when necessary, easily serviced. Also, in order to remain competitive the cost must not be excessive.

To this end, the present invention concerns an improved headlight assembly for agricultural or industrial equipment which provides superior lighting.

SUMMARY OF THE INVENTION

The present invention concerns the lighting on agricultrual or industrial equipment and particularly a dual headlight is disclosed which provides superior lighting, in a durable, easily manufactured, easily serviced configuration.

The dual headlight assembly has an outer transparent lens element. The lens element may be made of impact resistant plastic or glass or any other suitable material. The inner surfaces of the lens element have been cut to include corrective prismatics. The external surfaces, in the preferred plastic form have to be treated to ensure scratch resistance.

The present invention further includes an intermediate lamp reflector member defining a pair of generally adjacent reflective cavities. The dual cavities of the single member provide the reflecting surfaces for the forward and lateral lighting, thereby minimizing the number of parts. In the illustrated embodiment the cavities in the reflector member are positioned to provide even distribution of light around the tractor. The reflector member provides apertures to support and direct the light source.

Each lamp assembly is respectively positioned at the rear of the adjacent reflecting cavities. In the preferred form, the wiring for the lateral bulb will be encased in an extension tube to facilitate installation.

The rear enclosure member is positionable to generally enclose a reflector member and a lamp assembly when the reflector member is positioned between the lens element and enclosure member. The rear enclosure member includes 3 recesses contemplated for receiving iso-mounts and mounting hardware.

The rear enclosure member includes a removable access cover for easy installation and servicing. The removable access cover includes an electrical coupling to capture the lamp assemblies wiring. Once the access cover is replaced, the coupling is available for attachment from the exterior of the rear enclosure member.

The rear enclosure member is interposed in the transparent lens such that the peripheral lens lip encases the rear enclosure member. The contacting surfaces of the transparent lens and the rear enclosure shall be coated with an epoxy or silicone-based adhesive or similar material, thus the two members will be joined creating an air tight seal to prevent moisture and dust ingress.

Other advantages and features of the present invention will become readily apparent from the following detailed description, the accompanying drawings, and the appended claims.

DETAILED DESCRIPTION OF THE PREFERRED EMBODIMENT

Figure 1:
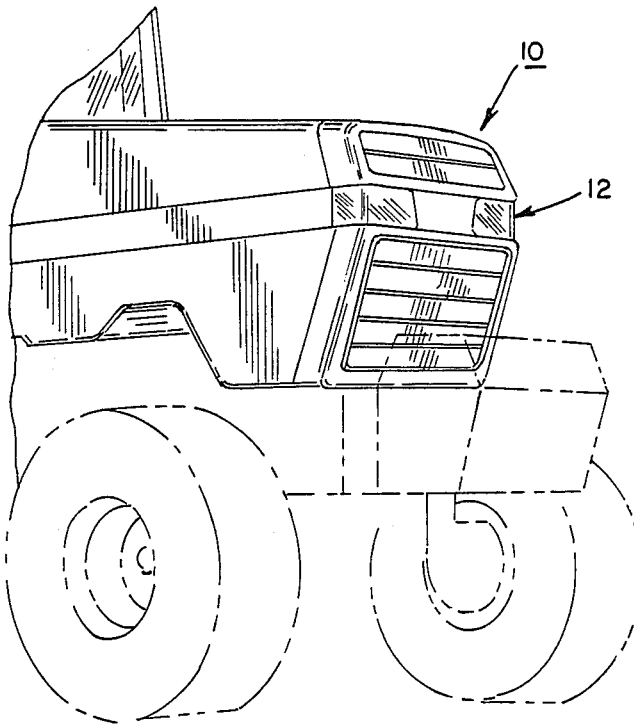
FIG. 1 is a perspective view of a front end of typical agricultural application, illustrated as a tractor with a representative dual headlight installed.
Figure 2:
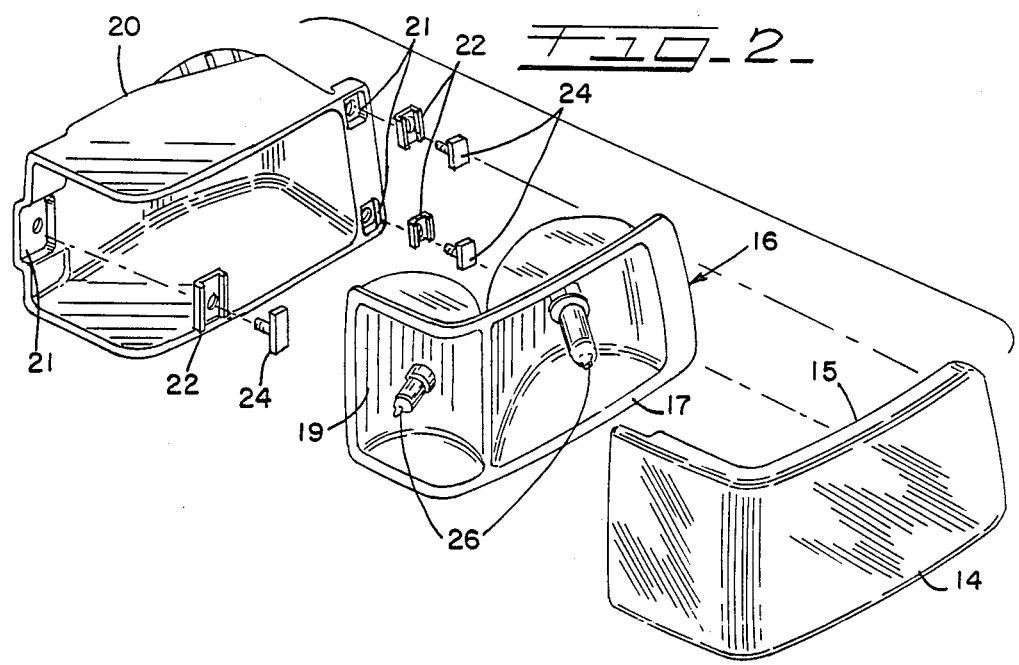
FIG. 2 is an exploded view showing the component parts of the dual headlight assembly.
Figure 3:
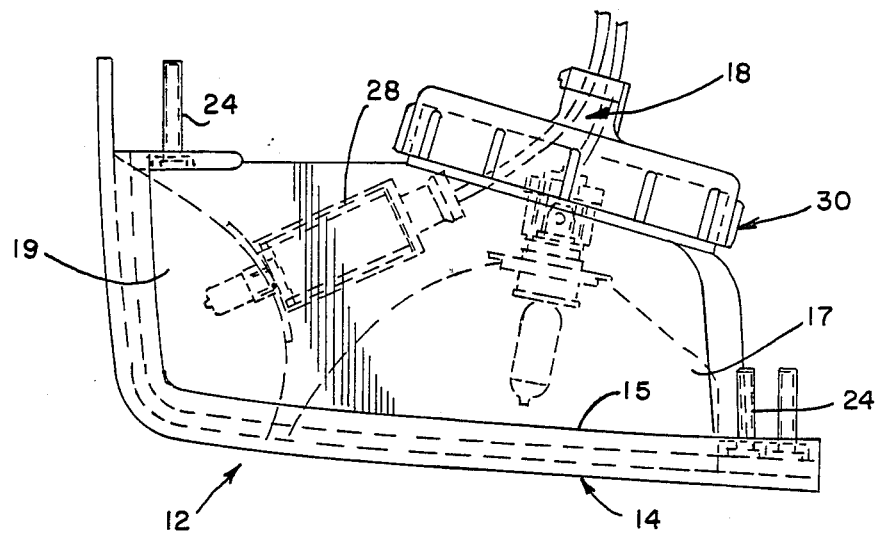
FIG. 3 is a top view of a fully assembled dual headlight.
Figure 4:
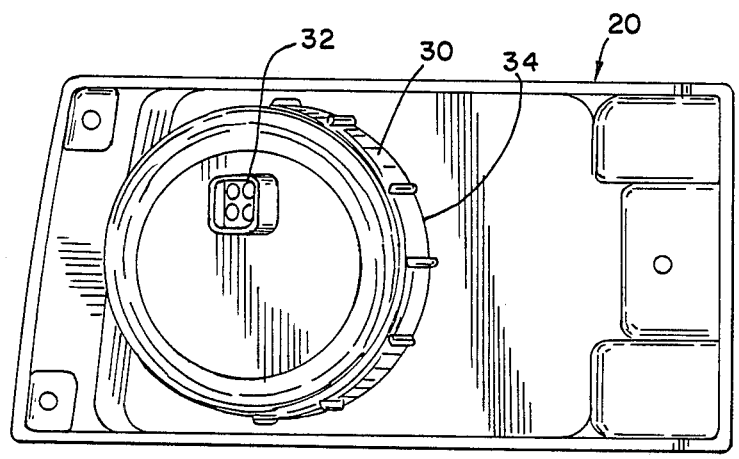
FIG. 4 is a back view of the rear enclosure member illustrating the access cover in its installed position.

While the present invention is susceptible of embodiment in various forms, there is shown in the drawings and will hereinafter be described a presently preferred embodiment, with the understanding that the present disclosure is to be considered as an exemplification of the invention, and is not intended to limit the invention to the specific embodiment illustrated.

Referring first to FIG. 1, therein is illustrated a tractor 10 having a dual headlight assembly 12 installed in the front of tractor 10 whereby the dual headlight provides illumination for the tractor while performing a wide variety of tasks.

In accordance with the present invention, the dual headlight 12 includes a transparent dual lens element 14 which provides protection and dispersement for both the forward and lateral halogen light bulbs 26. The transparent lens includes prismatics on the body inner surface of the lens element 14. The external surfaces of the lens have been treated with a glass resin to protect it from abrasions and effects of hydrocarbon fuels, oils and solvents. The lens element 14 itself is impact-resistant plastic or glass.

The intermediate lamp reflector 16 includes a pair of generally adjacent reflective cavities 17, 19. The cavities 17, 19 are joined such that the intersection occurs sufficiently far from the corner of the transparent lens element 14. This configuration allows the lateral cavity 19 to reflect not only laterally but also directs a portion of its light forward. The cavities 17, 19 are arranged to distribute light evenly over a broad area.

The cavities 17, 19 shown are part of a single lamp reflector member 16, thus reducing the number of piece parts.

In its preferred form, the lamp reflector member 16 is a mineral-filled polyester material to provide durability under exposure to ultra-violet rays and high temperature conditions. The lamp reflector member 16 will be coated or sprayed with a reflective surface like chrome.

The lamp assembly 18 includes 2 halogen bulbs 26, and the electrical sockets and wiring to support their operation.

The lamp assembly 18 is installed in the reflecting cavities 17, 19. The lateral cavity's bulb installation is facilitated by an extension tube 28 which enables the assembler to easily manipulate the bulb 26 into place through the tube 28 into the cavity 19. After acting as a guide for the bulb, the extension tube 28 remains in place as a protective casing for the lamp assembly's wiring.

The rear enclosure member 20 is positionable to generally enclose the reflector member 16 and the lamp assemblies 18 when the reflector member 16 is positioned between the lens element 14 and the enclosure member 20. In the preferred form, the enclosure member includes 3 recesses 21 for capturing iso-mounts 22 and mounting hardware 24. The iso-mounts 22 are employed to cushion and isolate the sensitive filaments of the halogen bulbs 26. The iso-mounts 22 are designed to protect through the range of velocities experienced by the vehicle.

In the preferred embodiment, the rear enclosure member 20 includes a removable access cover 30. The access cover 30 provides a method for quick access to repair or replace the lamp assembly 18 or halogen bulbs 26. The removable access cover 30, contains a gasket 34 to maintain an air tight seal and preferably employs an eighth-of-a-turn locking mechanism to provide quick and easy access. The removable access cover 30 has an electrical coupling socket attached thereto, this preferred feature improves durability and prevents loss when access cover 30 is removed for servicing.

The said rear enclosure member 20 is positioned in the transparent lens 14 such that the lens peripheral lip 15 encompasses the rear enclosure member 20. The contacting surface of the transparent lens lip 15 and the rear enclosure member 20 are sealed with silicone-based adhesive or epoxy. Thus, the two members, 20 and 14 are joined, creating an airtight seal to prevent moisture and dust ingress.

From the foregoing, it will be observed that numerous modifications and variations of the present dual headlamp assembly can be effected without departing from the true spirit and scope of the novel concept of the present invention. It will be appreciated that no limitation with respect to the specific embodiment disclosed herein are intended or should be inferred. The disclosure is intended to cover by the appended claims all such modifications as fall within the scope of the claims.

What is claimed is:

1. A composite dual headlight assembly comprising:
   an outer transparent lens element having integral prism means;
   an intermediate lamp reflector member defining a pair of generally adjacent reflective cavities;
   a pair of removable lamp assemblies respectivly positioned at the rear of each of said reflective cavities; and
   a rear enclosure member positionable to generally enclose said reflector member and said lamp assemblies when said reflector member is positioned between said lens element and said enclosure member, said rear enclosure member including a removable cover for access to said lamp assemblies.

2. The dual headlight assembly in accordance with claim 1, wherein
   said removable cover has an electrical coupling socket means for wiring.

3. A composite dual headlight assembly comprising:
   an outer, transparent lense element;
   an intermediate lamp reflector member defining a pair of generally adjacent reflective cavities and positionable adjacent said transparent lens element;
   a pair of lamp assemblies reflectively positioned at the rear of said pair of respective cavities;
   and a rear enclosure member positionable to generally enclose said reflector member and said lamp assemblies, said rear enclosure member including removable cover means for providing access to said lamp assemblies.

4. The composite dual headlight in accordance with claim 3, wherein
   said transparent lens element includes rearwardly-extending peripheral lip means, said intermediate lamp reflector member and said rear enclosure member being positionable generally within said peripheral lip means.

* * * * *